Sept. 8, 1970  J. D. MEADOR  3,527,620
METHOD OF USING NOBLE METAL THERMOCOUPLE
Filed Jan. 16, 1968  2 Sheets-Sheet 1

INVENTOR.
Jay D. Meador
BY
Peter P. Kozak
ATTORNEY

United States Patent Office 3,527,620
Patented Sept. 8, 1970

3,527,620
METHOD OF USING NOBLE METAL THERMOCOUPLE
Jay D. Meador, Indianapolis, Ind., assignor to General Motors Corporation, Detroit, Mich., a corporation of Delaware
Continuation-in-part of application Ser. No. 397,859, Sept. 21, 1964. This application Jan. 16, 1968, Ser. No. 704,970
Int. Cl. H01v 1/06
U.S. Cl. 136—201                 3 Claims

ABSTRACT OF THE DISCLOSURE

A method of using a thermocouple system including specific noble metal thermocouple elements connected at junctions to other specific dissimilar non-noble lead conductors wherein the thermocouple elements and the lead conductors are matched, comprising locating the junctions at different levels in a temperature gradient region which varies predictably with the medium to be temperature sensed so that the junctions are maintained at temperatures whereby either no EMF is generated at the junctions due to the dissimilar metals therein or the EMF generated in each junction is substantially equal so that they effectively offset one another.

---

This is a continuation-in-part application of Ser. No. 397,859 Meador, assigned to the assignee of the present application and now abandoned.

This invention relates to a thermocouple system and more particularly to a thermocouple temperature measuring system comprising thermocouple elements enabling operation at elevated temperatures under adverse conditions.

Thermocouples are usually employed in a gas turbine engine to sense the temperature of the gas in order to control the fuel flow to the engine and to perform other control functions and to prevent the development of engine temperatures from exceeding certain critical values which may damage or destroy the engine.

Gas turbine engines may have a gas temperature which exceeds 2000° F. or more and the atmosphere may be oxidizing. Thermocouples operating under such conditions should be highly sensitive to temperature changes in the sense of providing as large a change in output voltage as possible for a given change in the temperature to which the thermocouple junction is exposed, while at the same time providing a relatively stable output vs. temperature characteristic for extended periods of operation. Moreover, such thermocouples should be rugged, corrosion-resistant, non-brittling, shock-resistant, and, of course, reasonable in cost. The thermocouple elements should be highly resistant to the corrosive effects of the hot gases, both to minimize replacement costs and the need for frequently servicing and replacing the thermocouples. Prior art devices have proved inadequate under high temperature operating conditions and in providing the desirable characteristics mentioned above.

In thermocouple measuring systems it is common practice to connect the temperature measuring junctions of the thermocouple elements to the temperature reference junction by lead conductors constructed of the same materials as the thermocouple elements to avoid measurement errors that would otherwise result from thermocouple effects occurring at the junctions of the thermocouple elements and the lead conductors. Since, in aircraft turbine applications, the conductor leads are of considerable length, the cost of the applicable thermocouple system is dependent to a large extent on the cost of the metals used.

It is the basic object of this invention to provide a thermocouple system including a negative noble metal thermocouple element connected at one end to a positive noble metal thermocouple element to form a temperature sensing thermocouple junction, which are adapted to be exposed to the gaseous environment to be sensed and which are highly corrosion-resistant, non-brittle, have a high sensitivity to temperature changes and have an especially long life under the operating conditions encountered in a turbine engine or the like; and a negative lead conductor and a positive lead conductor, each formed of relatively inexpensive metals which are connected to the free ends of the aforesaid negative and positive noble metal elements, respectively, to form transition junctions. The noble thermocouple portions and the lead conductor portions are selected so that their junctions may be maintained at predetermined selected temperature levels which vary predictably with the temperature level of the medium being temperature sensed, whereby any EMF output due to the transition junction of the negative pair is substantially equal to the EMF output due to the transition junction of the positive pair, whereby any error due to the dissimilar metals at the aforesaid transition junctions is substantially eliminated.

These and other objects of the invention are accomplished in a specific embodiment of the invention by selecting Platinel 1503 alloy (an alloy consisting of about 65% gold and about 35% palladium) as the negative thermocouple element connected to an Alumel lead conductor to form the negative side or leg of the thermocouple system, and Platinel 1813 (an alloy consisting of about 55% palladium, about 31% platinum and about 14% gold) connected to a Chromel lead conductor to form the positive side or leg of the system. The free ends of the lead conductors are, of course, adapted to be connected across a multivolt meter or the like for measuring the EMF output of the legs.

As is well known in the art, Chromel is an alloy consisting of about 90% nickel and about 10% chromium; and Alumel is an alloy consisting of about 95% nickel, about 3% aluminum and the remainder silicon and manganese.

When the junctions of each of these legs are maintained at about 1300° F., there is substantially no net EMF generated at these junctions due to the dissimilar metals present therein with the result that no error is introduced into the system on this account. The equivalent of maintaining each of these junctions at 1300° F. may be obtained by maintaining one of the junctions at a preselected temperature above 1300° F., while maintaining the other at a calculated temperature whereby the negative EMF generated at one of the junctions is substantially equal to the positive EMF generated at the other junction with the result that they offset one another and likewise avoid the introduction of error into the system due to the dissimilar metals in the junctions. As will be explained hereinafter, the appropriate temperatures for heating the junctions may be accurately determined.

In a device such as a gas turbine engine including the gas inlet section containing the gas medium to be temperature sensed and an adjacent temperature gradient zone wherein the temperature gradient varies predictably with the temperature level of the medium to be sensed, the transition junctions may be located within the temperature gradient zone so that as above indicated the transition junctions are maintained at the appropriate temperature levels whereby errors due to EMF generated at the transition junctions is eliminated.

Other objects of the invention will be apparent from the following description, reference being made to the accompanying drawings, in which:

FIG. 8 is a graph showing the EMF vs. temperature calibration of Chromel, Alumel, Platinel 1813, and Platinel 1503 materials with platinum 27 reference.

FIG. 9 is a graphic computation.

Thermocouples presently used in many turboprop type engines employ Chromel and Alumel as both the thermocouple elements and the conductor leads. The life of the Chromel and Alumel thermocouple elements is very short compared to that of the other engine components and since it is impossible to repair them, the replacement thereof is an expensive item. Many studies and tests which have been conducted in an attempt to improve the life of the Chromel-Alumel thermocouple have been largely unsuccessful.

In its preferred embodiment the present invention involves the concept of replacing that portion of the conventional Chromel-Alumel thermocouple system where the thermocouple elements are exposed to the hot and corrosive gas stream with more durable thermocouple elements. It has been found that a thermocouple formed of dissimilar noble metals in which one wire or element is formed of an alloy known commercially as the Englehard Industries Platinel 1813 and consisting essentially on a weight basis of about 55% palladium, 31% platinum and 14% gold, and the other element is formed of an alloy known commercially as the Englehard Industries Platinel 1503 and consisting essentially on a weight basis of about 65% gold and 35% palladium has the desirable properties previously mentioned, a markedly improved life, and an EMF vs. temperature calibration similar to that of the Chromel-Alumel pair. This similar calibration, together with the noble metal lead conductor junction temperature control of this invention, allows the aforementioned noble metal thermocouple to be used with the Alumel-Chromel instrumentation and indicating equipment present in existing aircraft. This is of prime importance, since it would be prohibitively expensive to equip existing aircraft with the aforementioned noble metal thermocouples in addition to also redesigning and re-equipping the control and indicating system. In short, this invention in its preferred embodiment involves the use of the subject noble metal thermocouple in that portion of the thermocouple where the wire is exposed to the gas stream and the use of the Chromel-Alumel leads in the remainder of the circuit. This invention, as will appear hereinafter, further involves means whereby errors involved in using this combination are substantially eliminated.

Figure 1:
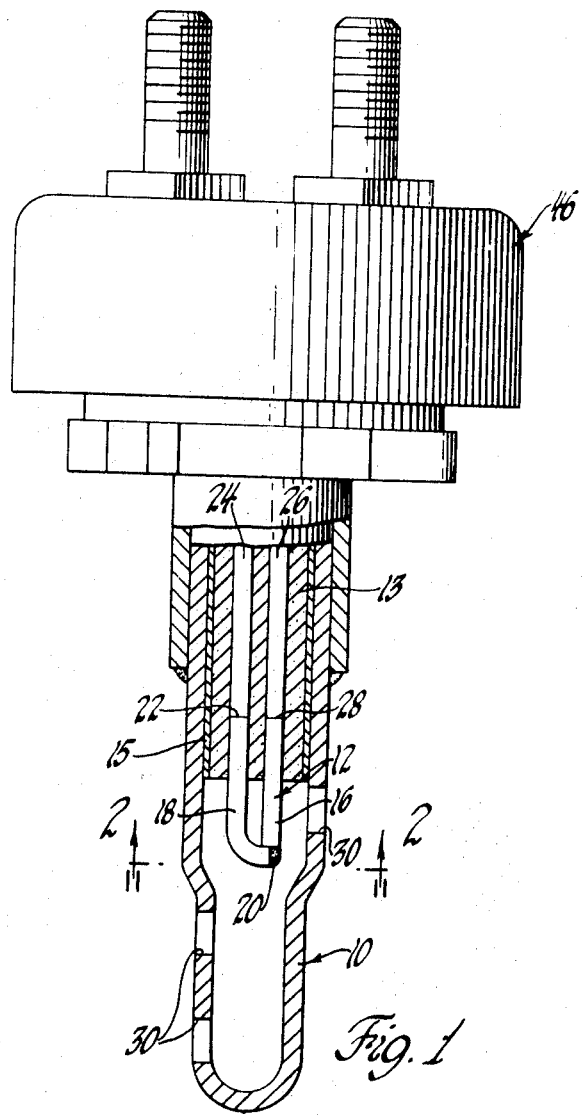
FIG. 1 shows a sheath thermocouple probe construction in which a thermocouple element and the lead conductors are supported in a housing adapted to be mounted through an aperture in the wall of the gas turbine.
Figure 2:
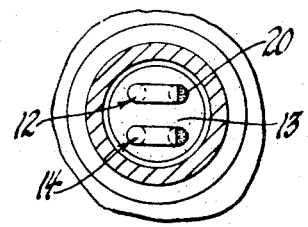
FIG. 2 is a cross-sectional view taken along the lines 2—2 of FIG. 1.

Referring now to FIGS. 1 and 2 of the drawings, there is shown a thermocouple probe which comprises a metal shell 10 having secured therein two sets of thermocouples 12 and 14. Each of the thermocouples are supported within the shell 10 and insulated therefrom and from each other by means of the magnesium oxide mass 13, a material having a high thermal and electrical resistance, retained in the stainless steel sleeve 15. Each thermocouple, as for example the thermocouple 12 of FIG. 1, consists of the thermoelectric elements 16 and 18 joined at 20 to form a temperature sensing or measurement (hot) junction. In order to withstand high temperatures and oxidizing corrosive gases encountered, for example, in the hot gas stream of a jet engine, the thermoelectric elements 16 and 18 are constructed of noble metals which will withstand such adverse conditions. In a specific embodiment the negative element 18 is formed of a noble metal alloy consisting essentially of 65% gold and 35% palladium (Platinel 1503). The other positive element 16 is formed of a noble metal alloy consisting essentially of 55% palladium, 31% platinum, and 14% gold (Platinel 1813). The element 18 is butt welded at the junction 22 to a negative Alumel conductor lead 24. The element 16 is butt welded to a positive Chromel conductor lead 26 at the junction 28. The shell 10 is provided with the openings 30 for admission of the hot gases to be measured.

The thermocouple unit shown in FIG. 1 has two couples 12 and 14. One of these is usually connected to a gauge for the pilot's use in observing and controlling the turbine temperature and the other is generally connected to a recording device. In some instances the two couples are used to enhance reliability.

Figure 5:
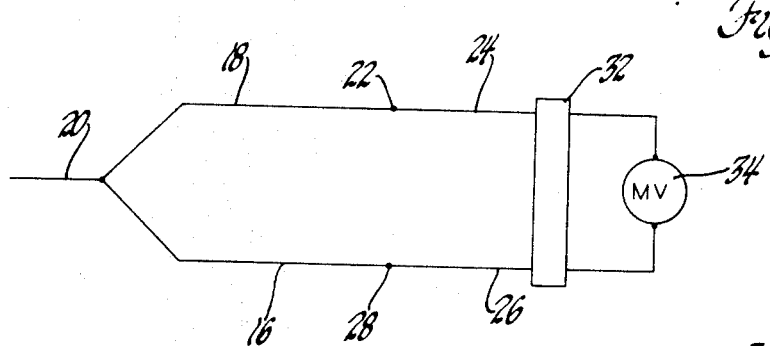
FIG. 5 is a circuit diagram showing how the thermocouple elements and the lead conductors of the thermocouple system are interconnected.

FIG. 5 is a circuit diagram showing more clearly the thermocouple hot junction 20, the junction 22 of the gold-palladium element 18 and the Alumel lead 24 and the junction 28 between the palladium-platinum-gold element 16 and the Chromel lead 26. The Alumel-Chromel leads are joined to form a temperature reference (cold) junction 32 which is associated with voltage measuring device 34 as is well known in the art.

Figure 6:
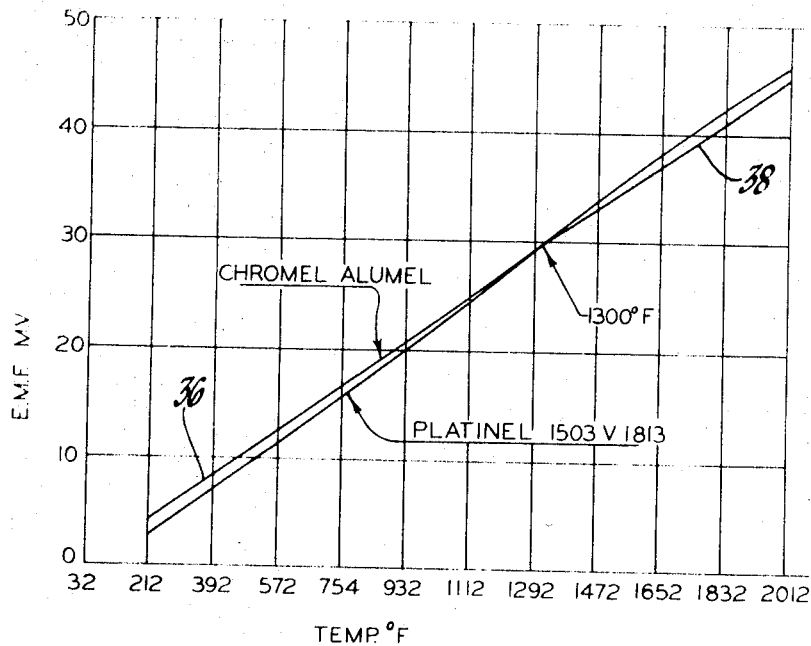
FIG. 6 is a graphic representation showing the EMF output in millivolts of the noble metal thermocouple elements and the lead elements over the operating temperature range.

As previously stated, the noble metal thermocouple elements are selected so that they have similar EMF outputs with temperature to the lead conductor pair. The curve 36 of FIG. 6 shows the variation of EMF output with temperature for the Chromel-Alumel pair and the curve 38 shows the EMF output with temperature for the noble metal pair Platinel 1503 and Platinel 1813. It will be observed that these curves are similar and particularly that they cross one another at about 1300° F. Accordingly, in accordance with this invention, the error due to thermoelectric effects at the transition junctions 22 and 28 of FIG. 5 is substantially eliminated by maintaining these junctions at approximately 1300° F. when in use, since no net EMF is generated at these junctions due to the dissimilar metals therein.

Figure 7:
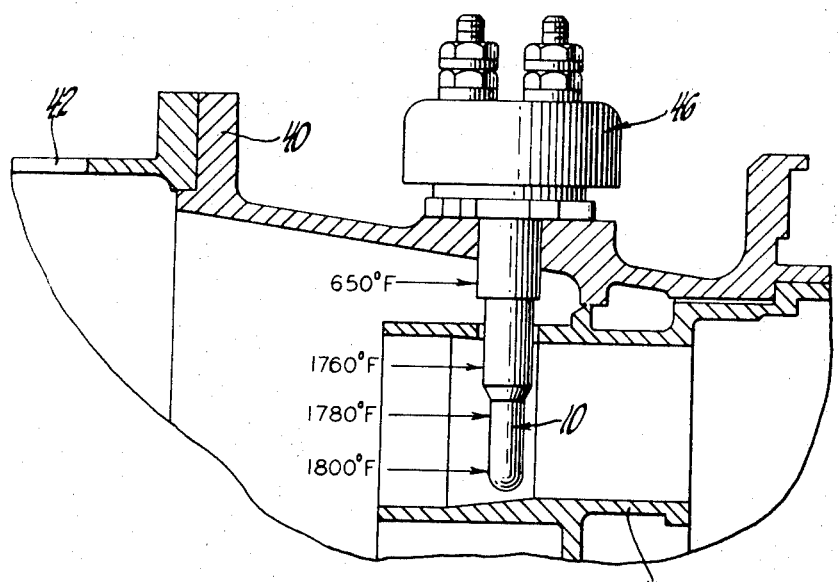
FIG. 7 shows the thermocouple of this invention associated with a gas turbine engine.

In a turbine application as shown in FIG. 7, the is conveniently accomplished by inserting the thermocouple a predetermined amount into the gas stream whereby the temperature of the junctions 22 and 28 are maintained at this or equivalent temperature. To illustrate this feature there is shown in FIG. 7 a portion of the gas inlet section of a turboprop engine. FIG. 7 shows the turbine inlet housing 40, combustion liner 42, and the turbine gas inlet vanes 44. It will be noted that, as indicated, there is typically a temperature gradient in the gas inlet portion of the turbine ranging from about 600 to 1800° F. This gradient varies predictably with the temperature level to be sensed. It is, therefore, readily apparent that the thermocouple 46 may be designed to be inserted a predetermined amount into the gas stream so that the junctions 22 and 28 are located at a point which will result in a temperature of about 1300° at the junction. This point is most easily found by a trial and error technique.

Figure 4:
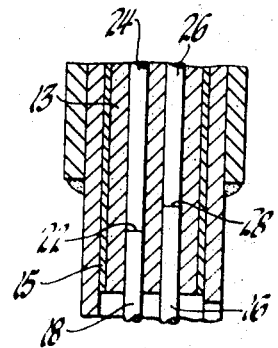
FIG. 4 is a fragmentary cross-sectional view of a further modification of the invention.

As stated above, error due to thermoelectric effects at the transition junctions 22 and 28 may be avoided by maintaining these junctions at about 1300° F. A more practical equivalent of this may be achieved by maintaining the negative junction 22 at a preselected temperature level, while maintaining the positive junction 28 at a calculated temperature level, so that the negative EMF generated at one of the junctions is offset by the positive EMF generated at the other junction. The physical embodiment of this is shown in FIG. 4 wherein the transition junctions 22 and 28 are offset longitudinally from each other so that when the thermocouple probe is inserted in the gas stream having a temperature gradient, each of these junctions is heated to a different temperature as is necessary for the EMF generated in these junctions to offset one another. With this arrangement, substantially accurate temperature measurements are obtained even though the temperature gradient varies from the gradient existing at the standard operating conditions at which the system is calibrated, since the gradient varies proportionally or predictably with the temperature level of the medium to be sensed.

Figure 3:
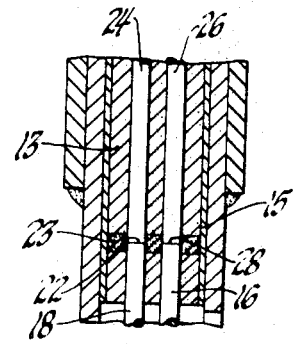
FIG. 3 is a fragmentary cross-sectional view of another embodiment of the invention.

To maintain improved temperature stability at the junctions 22 and 28 the insulation 23 as shown in FIG. 3 about the junctions 22 and 28 is preferably formed of high density beryllium oxide portion 23 which is an excellent electrical insulator but a thermal conductor approaching that of many metals. The use of this material to insulate the junctions provides a zone of relatively constant temperature and thus reduces the tolerance on the location of the junctions in the engine. Moreover, it has been found that a high degree of accuracy is obtained when the junctions 22 and 28 are butt welded in an inert atmosphere, such as helium, and further when the butt weld is made perpendicular with respect to the longitudinal axis of a thermocouple, these junctions may then be located precisely at a point where the desired temperatures exist in the assembly.

Appropriate different temperatures for heating the junctions 22 and 28 to achieve this compensating result may be determined from the curves shown in FIG. 8, which show individual wire calibration of the Chromel, Alumel, Platinel 1813, and Platinel 1503 materials with a platinum 27 reference, and by the graphic solution indicated in FIG. 9.

A specific illustration of this method will now be described in connection with the provision of a thermocouple for use in measuring the gas inlet temperature in the Allison T 56–A–18 gas turbine engine up to 2100° F. Since the engine is designed to operate normally at about the optimum temperature of 2000° F., a design temperature of 2000° is assumed for the hot junction.

The thermal gradient along the wires in the thermocouple probe is determined by the design of the thermocouple. The Platinel 1503-Alumel and the Platinel 1813-Chromel transition points 22 and 28, respectively, must be placed in the area of the probe where the thermal gradient is relatively constant while the engine temperature changes. This is done to insure accuracy of temperature measurement throughout the operating temperature range of the engine. In the T 56–A–18 engine, it is desirable to locate these transition points approximately five-eighths inch from the end of the ceramic insulation 13 shown in FIG. 1. At this point the temperature in the assembly is approximately 1000° F., when the engine is operating at 2000° F., the design point. The positive transition junction 28 (Platinel 1813 to Chromel) is located so that it is at 1000° F. Referring to FIG. 5, it is seen that the temperature measuring junction 20 is fixed at 2000° F., whereas the junction 28 is fixed at 1000° F. as above indicated. All that remains now is to establish the appropriate temperature for the negative transition junction 22 (Platinel 1503 to Alumel) and to locate it in the gas stream at this temperature. The EMF generated under these conditions should be the same as the EMF generated by the standard Chromel-Alumel system which is 44.9 millivolts under the same conditions. The appropriate temperature for the junction 22 may be computed or determined graphically so that this EMF of 44.9 millivolts is produced by the circuit. The procedure is as follows. As previously indicated, FIG. 8 is a plot of EMF vs. temperature for the materials to be used and these values are referred to a platinum 27 base line. Graphically, the algebraic addition of EMF values may be accomplished as shown in FIG. 9. Beginning at 32° F., a line is laid out from 32° F. (zero EMF) to 1000° F. with the slope of the Chromel line in FIG. 8. Then, the Platinel 1813 line is drawn from 1000° F. to 2000° F. with the slope of the Platinel 1813 curve of FIG. 8 intersecting the Chromel curve at 1000° F. The Platinel 1503 line is then drawn with the slope of the Platinel 1503 curve of FIG. 8 intersecting the Platinel 1813 line at 2000° F. and going to lower temperatures. The Alumel line is then drawn from 32° F. at the EMF of the 44.9 millivolts, the desired output, with the slope of the Alumel curve of FIG. 8. The intersection of the Alumel line and the Platinel 1513 line determines the proper temperature for the junction 22 to be 1030° F. The transition junction 22 is now located in a probe, so that when inserted in the engine it is located at this temperature.

Although the invention has been described in the form of a preferred embodiment, it is obvious that other forms may be adopted and the invention is not limited except by the following claims.

I claim:

1. A method of using a high temperature thermocouple system in combination with apparatus, said apparatus comprising a first zone containing a medium to be temperature sensed and a temperature gradient zone adjacent said first zone which varies predictably with the changes in the temperature level in said first zone, said high temperature thermocouple system comprising a pair of interconnected thermoelectric elements forming a first junction located in said first zone, one of said elements being an alloy consisting essentially of about 55% palladium, 31% platinum, and 14% gold and the other of said elements consisting essentially of about 65% gold and 35% palladium, a chromel lead conductor connected to said one element at a second junction and an Alumel lead conductor connected to said other element to form a third junction, said method comprising locating each of said second and third junctions at a different temperature level along said temperature gradient zone so that they are offset longitudinally from each other and the net EMF generated in said second and third junctions is substantially equal to zero.

2. The method defined in claim 1 wherein said second junction is located at a selected temperature level in said gradient zone and said third junction is located at a different calculated temperature level in said gradient zone to produce a net EMF which coupled with the EMF generated in the first junction equals the output of a Chromel-Alumel thermocouple junction at the same first junction temperature.

3. The method of claim 1, wherein said apparatus is a gas turbine engine, said first zone is a gas inlet housing within said engine, said medium to be temperature sensed is a hot gas stream contained within said housing and said temperature gradient zone is a temperature gradient zone adjacent said stream which varies predictably with changes in the temperature level in said stream.

References Cited

UNITED STATES PATENTS

| 1,025,715 | 5/1912  | Peake           | 136—227   |
| 2,337,000 | 12/1943 | Ray             | 136—227   |
| 3,007,988 | 11/1961 | Jaffe et al.    | 136—227   |
| 3,065,286 | 11/1962 | Connell         | 136—233   |
| 3,066,177 | 11/1962 | Schneider et al.| 136—241   |
| 3,099,575 | 7/1963  | Hill            | 136—241 X |
| 3,159,032 | 12/1964 | Rademacher et al.| 73—359   |
| 3,296,035 | 1/1967  | Zysk            | 136—227   |

(Other references on following page)

UNITED STATES PATENTS

| | | | |
|---|---|---|---|
| 3,328,209 | 6/1967 | Schneider | 136—227 |
| 3,329,533 | 7/1967 | Zysk | 136—227 |
| 3,372,062 | 3/1968 | Zysk | 136—227 |

OTHER REFERENCES

General Electric Co. GEA4936. G. E. Co. Apparatus Dept., Schenectady, N.Y. December 1947. 1 p.

Honeywell Specification Sheet No. 306, Minneapolis-Honeywell Regulator Co. Industrial Div., Philadelphia, Pa., February 1952, 2 pp.

JOHN H. MACK, Primary Examiner

A. BEKELMAN, Assistant Examiner

U.S. Cl. X.R.

136—231; 73—359